United States Patent
Vitale (10) Patent No.: US 11,584,047 B2
(45) Date of Patent: Feb. 21, 2023

(54) SEALING MEMBER FOR A POWDER SLUSH MOLDING APPARATUS

(71) Applicant: Faurecia Interior Systems, Inc., Auburn Hills, MI (US)

(72) Inventor: Peter Vitale, Windsor (CA)

(73) Assignee: Faurecia Interior Systems, Inc., Auburn Hills, MI (US)

(*) Notice: Subject to any disclaimer, the term of this patent is extended or adjusted under 35 U.S.C. 154(b) by 104 days.

(21) Appl. No.: 16/831,598

(22) Filed: Mar. 26, 2020

(65) Prior Publication Data

US 2021/0299917 A1  Sep. 30, 2021

(51) Int. Cl.
*B29C 41/34* (2006.01)
*B29C 41/18* (2006.01)

(52) U.S. Cl.
CPC .............. *B29C 41/34* (2013.01); *B29C 41/18* (2013.01)

(58) Field of Classification Search
CPC ................................. B29C 41/18; B29C 41/34
See application file for complete search history.

(56) References Cited

U.S. PATENT DOCUMENTS 5,849,341 A * 12/1998 Johno ................. B29C 33/0038
425/425

FOREIGN PATENT DOCUMENTS

| DE | 202012101486 U1 | 6/2012 |
| DE | 202013104242 U1 | 9/2013 |
| FR | 2763533 A1 | 11/1998 |
| JP | 08229964 A * | 9/1996 |
| JP | 11048267 A | 2/1999 |
| JP | 2008168450 A | 7/2008 |
| JP | 2012250458 A | 12/2012 |
| JP | 2019073029 A * | 5/2019 |

OTHER PUBLICATIONS

Machine translation JPH08229964A (Year: 1996).*
Machine translation JP2019073029A (Year: 2019).*
Wikipedia definition—rhomboid: https://en.wikipedia.org/wiki/Rhomboid (Year: 2019).*
Varsity Tutors publication—Hot math https://www.varsitytutors.com/hotmath/hotmath_help/topics/quadrilaterals (Year: 2007).*
EG. Olshevsky (as quoted by A. Doskey) Elementary Honeycombs http://www.orchidpalms.com/polyhedra/honeycombs/honeycombs.htm (Year: 2008).*

* cited by examiner

*Primary Examiner* — Matthew J Daniels
*Assistant Examiner* — Wayne K. Swier
(74) *Attorney, Agent, or Firm* — Reising Ethington P.C.

(57) ABSTRACT

A sealing member for a powder slush molding apparatus includes an elastomeric main body comprising a head portion, an anchor portion, and a neck portion extending between and joining the head portion and the anchor portion. The head portion of the sealing member defines at least one interior channel that is centered on a midline of the elastomeric main body and which has a polygonal sectional shape. The polygonal sectional shape of the at least one interior channel, and its location on the midline, permits the head portion of the sealing member to attain a measure of compressibility that helps limit the force needed to compress the head portion without rendering the sealing member too flexible that it cannot adequately retain its shape. The sealing member is useful in establishing a seal between a shell and a powder box of a powder slush molding apparatus.

20 Claims, 5 Drawing Sheets

SEALING MEMBER FOR A POWDER SLUSH MOLDING APPARATUS

TECHNICAL FIELD

The present disclosure relates generally to a sealing member for use with a powder slush molding apparatus and, more particularly, to a sealing member configured to be disposed and compressed between and shell and a powder box of the powder slush molding apparatus.

BACKGROUND

Powder slush molding is a process that is capable of forming polymer skins for various purposes including, for example, to serve as decorative surface coverings for interior automobile components. Powder slush molding is practiced using a rotatable powder slush molding apparatus that includes a powder box and a mold. The powder box defines a powder reservoir that holds a charge of a powdered resin, and the mold includes a shell that is disposed over and covers an opening to the powder reservoir when the powder box and the mold are coupled together. The shell includes at least one forming surface that faces interiorly towards the powder reservoir. During powder slush molding, the shell is heated, and the powder slush molding apparatus is rotated to expose the forming surface of the shell to the powdered resin as the powdered resin falls out of the powder reservoir and into contact with the forming surface, and then falls back into the powder reservoir, over the course of multiple rotations of the apparatus. The powdered resin that contacts the forming surface of the heated shell melts and becomes adhered to the forming surface while the powdered resin that does not melt and adhere to the forming surface simply returns to the powder reservoir. Once the deposited polymer layer has reached a desired thickness, the rotation of the apparatus is ceased, the shell is cooled, and the resultant polymer skin is removed.

The powder box and the shell are urged together when the powder slush molding apparatus is in use to maintain the relationship between the two component parts and to prevent powdered resin from escaping the apparatus. To help in that regard, a sealing member is disposed between confronting sealing surfaces of the powder box and the shell and circumscribes the forming surface of the shell. Typically, an anchor portion of the sealing member is received into a seal retention groove defined in the sealing surface of the powder box. The anchor portion and its respective groove in the powder box may be correspondingly shaped so that some form of manipulation of the anchor portion is needed to forcibly extract the anchor portion of the sealing member from the groove. The sealing member also includes a head portion that projects above the sealing surface of the powder box and engages the sealing surface of the shell. The head portion and the anchor portion of the sealing member may be connected by a reduced-thickness neck portion that aids the ability of the sealing member to be retained in the powder box groove.

The shell of the mold needs to be heated and cooled rather quickly to support forming the polymer skin on the forming surface with consistent regularity and good process efficiency. The shell is typically thin—usually on the order of 1-5 mm thick—and is three-dimensionally shaped to provide the forming surface with a contour that elicits a complimentary profile in the polymer skin. The shell may be formed of various metals including nickel, a nickel-based alloy, or a nickel-plated base metal. Because the shell is constructed from a relatively thin metal and, during powder slush molding, is urged toward the powder box through the intervening sealing member, the compressibility and side-to-side flexibility of the sealing member are characteristics that warrant some consideration. If the sealing member and, in particular, the head portion is too rigid, the forces that must be applied to the shell to compress the sealing member may damage and crack the shell. A sealing member that lacks adequate compressibility may also require the powder box and the mold to be brought together with a more-exacting alignment under tight tolerances. However, if the sealing member is too compressible, the sealing member may easily deform off-center, which can lessen the reliability of the seal between the powder box and the shell and reduce the ability of the sealing member to stay anchored in the powder box groove. A sealing member that exhibits the appropriate degree of compressibility so that a satisfactory balance between sealing performance and shape retention can be achieved in the context of a powder slush molding apparatus is therefore needed.

SUMMARY

A sealing member for a powder slush molding apparatus is disclosed. The sealing member comprises an elastomeric main body that extends between a first end and a second end along a height dimension of the sealing member. The elastomeric main body includes a head portion that includes an exterior surface and that provides the first end of the main body, an anchor portion that provides the second end of the main body, and a neck portion that extends between and joins the head portion and the anchor portion of the main body. Each of the head portion, the anchor portion, and the neck portion is bisected by a midline that runs parallel to the height dimension of the sealing member. The elastomeric main body defines at least one interior channel within the head portion that is centered about the midline. The at least one interior channel extends along a length dimension of the sealing member and has a polygonal sectional shape in a plane oriented orthogonal to the length dimension of the sealing member. The at least one interior channel is defined by an interior wall surface of the elastomeric main body that includes one vertex on one side of the midline and another vertex on the other side of the midline. The two vertices are intersected by a transverse line that extends through the head portion of the elastomeric main body within the sectional plane and is orthogonal to the height dimension of the sealing member.

DRAWINGS

Example embodiments will hereinafter be described in conjunction with the appended drawings, wherein like designations denote like elements, and wherein.

DETAILED DESCRIPTION

A sealing member is disclosed that requires relatively moderate forces to compress along a height dimension. In many instances, less than 40 N of force is needed to compress the sealing member having an uncompressed height of 50 mm by up to 5 mm in height. The sealing member is particularly useful in the context of powder slush molding to provide a seal between a powder box and a shell having at least one forming surface upon which a polymer skin is formed during the powder slush molding process. As will be described in more detail below, an elastomeric main body of the sealing member includes a head portion that defines at least one interior channel. The interior channel extends along a length dimension of the sealing member and has a polygonal sectional shape that is centered on a midline of the elastomeric main body. The polygonal sectional shape of the at least one interior channel, and its location on the midline of the elastomeric main body, allows for better control of the collapsibility of the head portion and, accordingly, enables the sealing member to be constructed with the correct degree of compressibility for powder slush molding applications while also permitting the compressibility of the sealing member to be more accurately tailored to a particular application. Various embodiments of the sealing member are described below in conjunction with the drawing figures.

Figure 1:
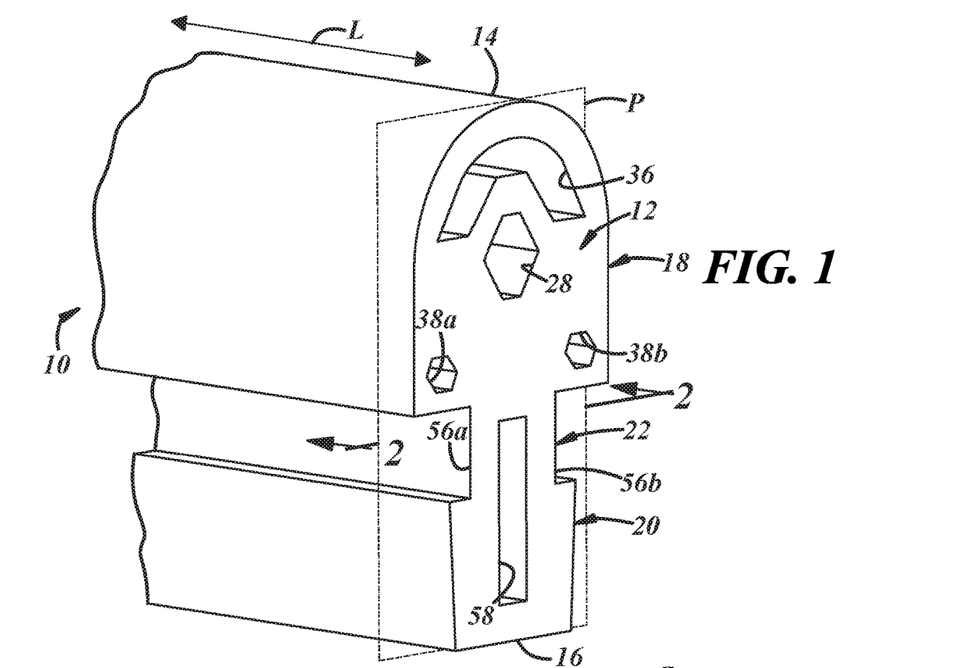
FIG. 1 is a perspective view of a sealing member for a powder slush molding apparatus according to one embodiment of the present disclosure.
Figure 2:
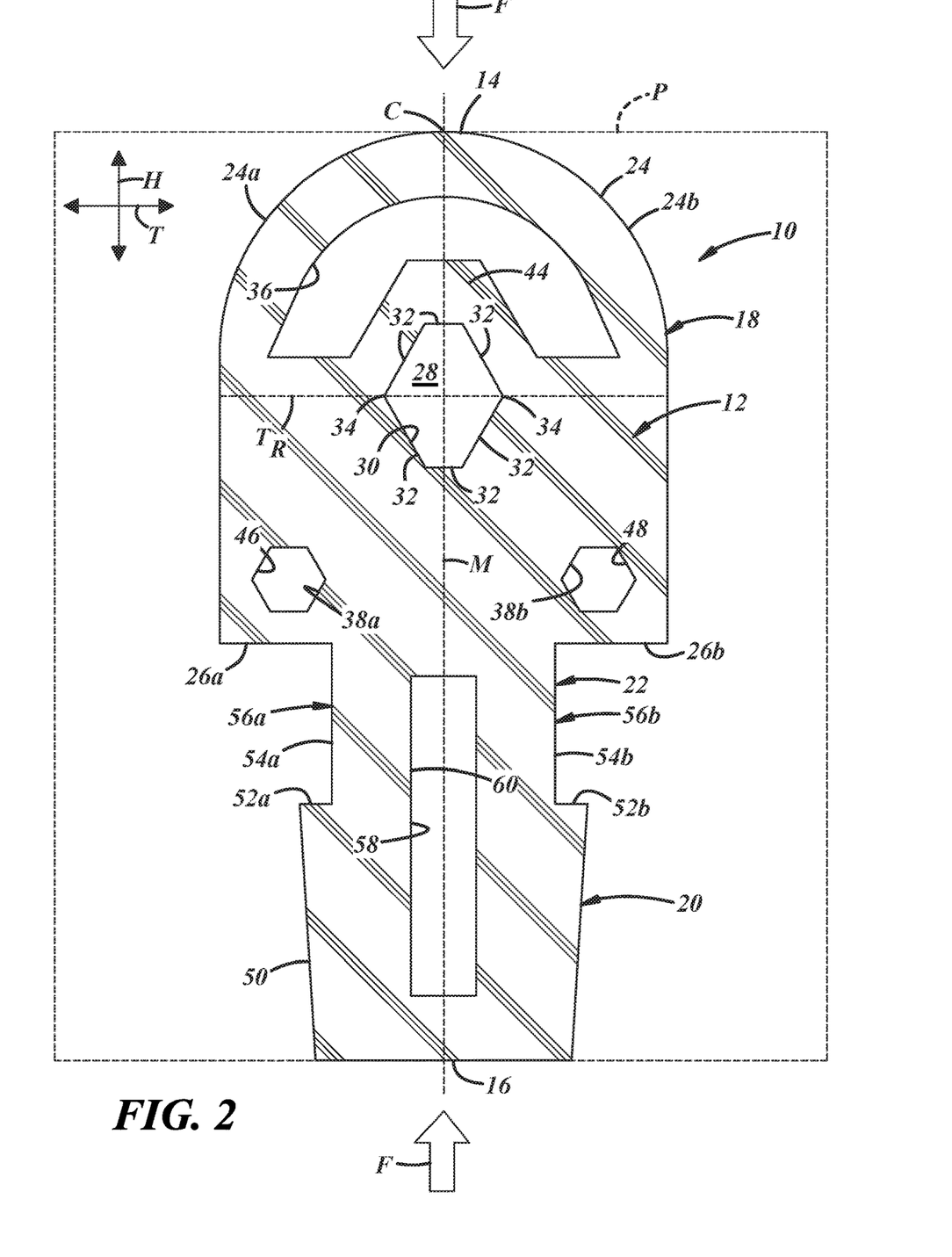
FIG. 2 is a cross-sectional view of the sealing member illustrated in FIG. 1, taken along section lines 2-2, according to one embodiment of the present disclosure.
Figure 3:
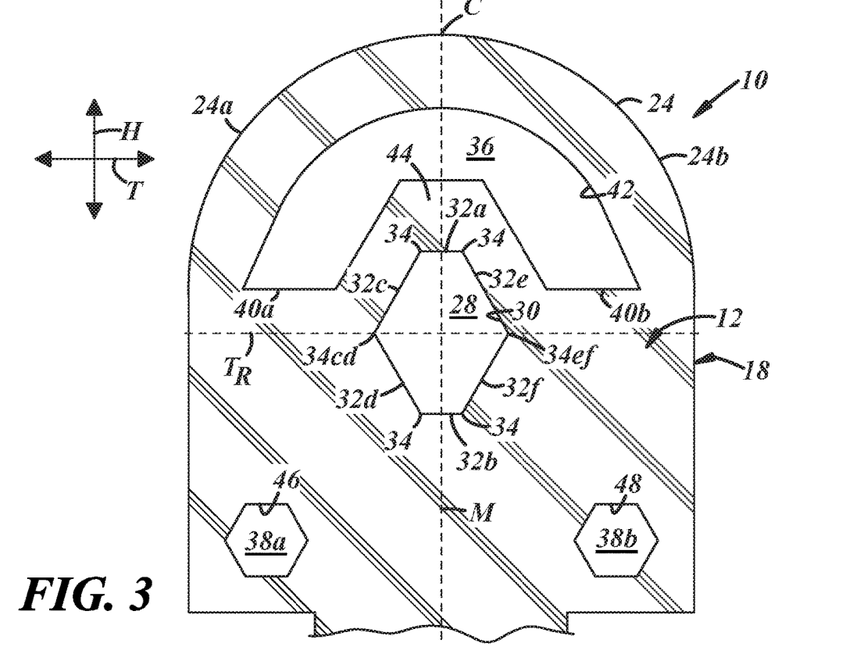
FIG. 3 is a magnified partial view of the cross-sectional depiction of the sealing member in FIG. 2 according to one embodiment of the present disclosure.

Referring now specifically to FIGS. 1-3, an embodiment of the sealing member is depicted. The sealing member is identified by reference numeral 10. The sealing member 10 extends longitudinally along a length dimension L, which is the largest dimension of the sealing member 10, and has a height dimension H and a thickness dimension T in a sectional plane P oriented orthogonal to the length dimension L. The sealing member 10 includes an elastomeric main body 12 that has a first end 14 and a second end 16 that are spaced apart along the height dimension H of the sealing member 10. The elastomeric main body 12 may be composed of any of a wide variety of elastomeric materials that can withstand the heating and cooling demands of powder slush molding. In a preferred implementation, the elastomeric main body 12 is composed of silicone rubber, which is a crosslinked polysiloxane. Other examples of elastomeric materials that may be good candidates for the elastomeric main body 12 include polyurethane-based elastomers and petroleum-based rubbers.

The elastomeric main body 12 includes a head portion 18 that provides the first end 14 of the main body 12, an anchor portion 20 that provides the second end 16 of the main body 12, and a neck portion 22 that extends between and joins the head portion 18 and the anchor portion 20. The head portion 18, the neck portion 22, and the anchor portion 20 are aligned consecutively along the height dimension H of the sealing member 10 and are bisected by a midline M of the main body 12 that runs parallel to the height dimension H to provide symmetrical halves of the main body 12. The head portion 18 of the sealing member 10 is compressible from an uncompressed state to a compressed state under a compression force F, in which case a height of the head portion 18 as measured along the height dimension H decreases, and is relaxable from the compressed state to the uncompressed state by relieving the compression force F, in which case the height of the head portion 18 increases. A thickness of each of the head portion 18 and the anchor portion 20 as measured along the thickness dimension T is also greater than a thickness of the neck portion 22 as measured along the same dimension.

The head portion 18 of the elastomeric main body 12 of the sealing member 10 has an exterior surface 24 that extends outwardly and downwardly from a centerline C, which coincides with the midline M of the main body 12, to first and second lateral shoulder surfaces 26a, 26b that extend inward from the exterior surface 24 towards the midline M. The exterior surface 24 includes a first exterior side surface 24a and a second exterior side surface 24b that extend in opposite directions from the centerline C to their respective first and second lateral shoulder surfaces 26a, 26b. In this embodiment, each of the first and second exterior side surfaces 24a, 24b has a smooth convex profile from the centerline C to its respective lateral shoulder surface 26a, 26b that is free from intrusions or projections that deviate from the nominal profile of the surface beyond normal manufacturing tolerances. To that end, the exterior surface 24 may be continuously curved or it may include a series of adjoining planar surfaces that are angled relative to each other to achieve the smooth convex profile. The head portion 18 of the elastomeric main body 12 also defines a number of interior passageways that help the head portion 18 achieve the desired degree of compression and overall function when pressed into its compressive state by the compressive force F.

As shown best in FIGS. 2-3, the head portion 18 defines at least one interior channel 28 that extends along the length dimension L of the sealing member 10 and is centered on the midline M of the elastomeric main body 12. The interior channel 28 has a polygonal sectional shape when viewed in the sectional plane P and is defined by a first interior wall surface 30 having a plurality of interconnected interior planar wall segments 32a-32f. Each of the interior planar wall segments 32a-32f that defines the interior channel 28 extends between two other interior wall segments. Each pair of adjacent interior planar wall segments 32a-32f thus intersects at a vertex 34 and forms an angle. As a result of being centered on the midline M of the elastomeric main body 12, the interior channel 28 is divided equally by, and is symmetric about, the midline M. Additionally, two side vertices 34cd, 34ef of the interconnected interior planar wall segments 32a-32f—one vertex on each side of the midline M—that define the interior channel 28 are intersected by a transverse line $T_R$ that extends through the head portion 18 within the sectional plane P and is orthogonal to the height dimension H of the sealing member 10. The transverse line $T_R$ also divides the interior channel 28, equally or unequally, such that part of the interior channel 28 ascends above the transverse line $T_R$ and part of the interior channel 28 descends below the transverse line $T_R$. The transverse line $T_R$ is orthogonal to the height dimension H when it is oriented 90° to the height dimension H with a tilt deviation of up to 5° in either direction being permissible.

The polygonal sectional shape of the interior channel 28 may assume any of a variety of polygonal shapes that can be centered on the midline M. For example, as shown here in FIGS. 2-3, the interior channel 28 may have a hexagonal shape as defined by the first interior wall surface 30 of the elastomeric main body 12. The first interior wall surface 30 is defined by six interior planar wall segments 32a-32f—notably, a top interior planar wall segment 32a, a bottom interior planar wall segment 32b, two opposed upper side interior planar wall segments 32c, 32e, and two opposed lower side interior planar wall segments 32d, 32f. The hexagonal sectional shape is dividable symmetrically about the midline M and has two opposed side vertices 34cd, 34ef established between the upper and lower side interior planar wall segments 32c, 32d, 32e, 32f that are intersected by the transverse line $T_R$. Because the side vertices 34cd, 34ef of the upper and lower side interior planar wall segments 32c, 32d, 32e, 32f are disposed on opposite sides of the midline M in transverse linear alignment, the head portion 18 is more easily collapsible in the height dimension H of the sealing member 10 compared to an interior channel that assumes a rounded sectional shape (e.g., circle or oval) since the vertices 34cd, 34ef act as hinges that ultimately accommodate collapsibility in the height dimension H.

In addition to the at least one interior channel 28, the head portion 18 of the elastomeric main body 12 may also define an interior arcuate slot 36 as well as first and second interior supplemental side bores 38a, 38b, as shown in FIGS. 2-3. The arcuate slot 36, if present, extends between distal ends 40a, 40b and is defined by a second interior wall surface 42 of the elastomeric main body 12. The arcuate slot 36 is located between the interior channel 28 and the exterior surface 24 of the head portion 18 but does not extend all the way to the transverse line $T_R$. Additionally, the arcuate slot 36 is curved towards the at least one interior channel 28—meaning the arcuate slot 36 exhibits concavity towards the interior channel 28—and partially overlaps with the interior channel 28 in the height dimension H. The arcuate slot 36 is also preferably divided equally by, and is symmetric about, the midline M of the elastomeric main body 12. As a result, the head portion 18 may include an interior arched wall 44 disposed equally about the midline M that separates the arcuate slot 36 and the at least one interior channel 28 and that further provides a portion of the first interior wall surface 30 and a portion of the second interior wall surface 42. One particular function of the arcuate slot 36 may be to help the exterior surface 24 deform and flatten along the centerline C when the head portion 18 is compressed so that the contacting area of the exterior surface 24 is enlarged to promote better sealing.

The first and second interior supplemental side bores 38a, 38b, if present, are defined by third and fourth interior wall surfaces 46, 48 of the elastomeric main body 12, respectively, and are spaced apart along the thickness dimension T with the first supplemental side bore 38a being defined on one side of the midline M and the second supplemental side bore 38b being defined on the other side of the midline M. The first and second interior supplemental side bores 38a, 38b are preferably diametrically opposed about the midline M of the elastomeric main body 12 and may assume any of a wide variety of sectional shapes including circular, ovular, hexagonal, rhomboidal, pentagonal, heptagonal, and octagonal. As for their location relative to the interior channel 28, the first and second supplemental side bores 38a, 38b are located below the transverse line $T_R$ and opposite the ends 40a, 40b of the arcuate slot 36, if all of the optional interior passageways 36, 38a, 38b are in fact present. One particular function of the supplemental side bores 38a, 38b is to help their proximate first and second lateral shoulder surfaces 26a, 26b of the head portion 18 deform when the head portion 18 is compressed in the event that such deformation would contribute to better sealing.

The anchor portion 20 of the main body 12 of the sealing member 10 has an exterior surface 50 and first and second lateral shoulder surfaces 52a, 52b that extend inward from the exterior surface 50 towards the midline M. The exterior surface 50 of the anchor portion 20 may taper inwards toward the midline M of the elastomeric main body 12 from the first and second lateral shoulder surfaces 52a, 52b towards the second end 16 of the main body 12, as shown, or it can be contoured in myriad other ways. The thickness of the anchor portion 20 is less than the thickness of the head portion 18 but greater than the thickness of the neck portion 22. Consequently, the neck portion 22 of the elastomeric main body 12 includes first and second side connection surfaces 54a, 54b, each of which extends between and joins one of the first or second lateral shoulder surfaces 26a, 26b of the head portion 18 to one of the first or second lateral shoulder surfaces 52a, 52b of the anchor portion 20, respectively.

On each side of the elastomeric main body 12, the corresponding lateral shoulder surface 26a, 26b of the head portion 18, the side connection surface 54a, 54b, and the lateral shoulder surface 52a, 52b of the anchor portion 20 define a depressed longitudinal recess 56a, 56b that extends in the length dimension L. This allows the anchor portion 20 and the neck portion 22 to be received and mechanically retained in a seal retention groove of a sealing surface. And, to further enhance the manipulability of the anchor portion 20 and the neck portion 22 so that those portions 20, 22 can be inserted into and mechanically retained within a seal retention groove, if desired, the neck portion 22 and the anchor portion 20 of the elastomeric main body 12 may define a linear slot 58. The linear slot 58 is defined by a fifth interior wall surface 60 of the elastomeric main body 12 and is centered on the midline M while having a height as measured along the height dimension H that is greater than a thickness as measured along the thickness dimension T. Preferably, the height of the linear slot 58 is at least three times greater, and is preferably three to ten times greater, than the thickness of the slot 58.

Figure 4:
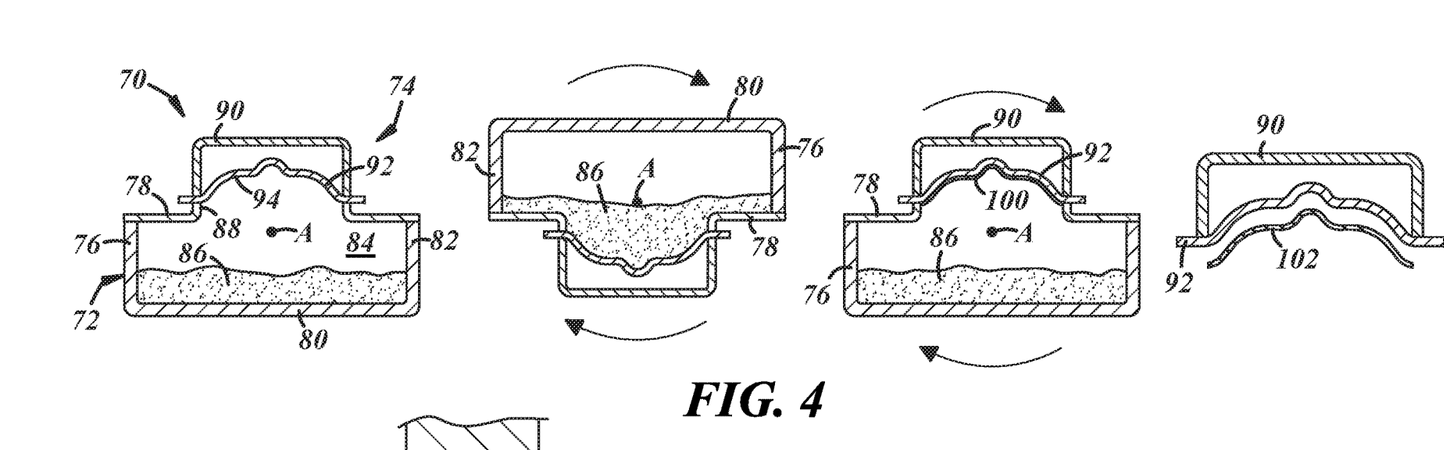
FIG. 4 is schematic depiction of a powder slush molding apparatus in which the sealing member of the present disclosure may be used as well as a schematic depiction of a powder slush molding process.
Figure 5:
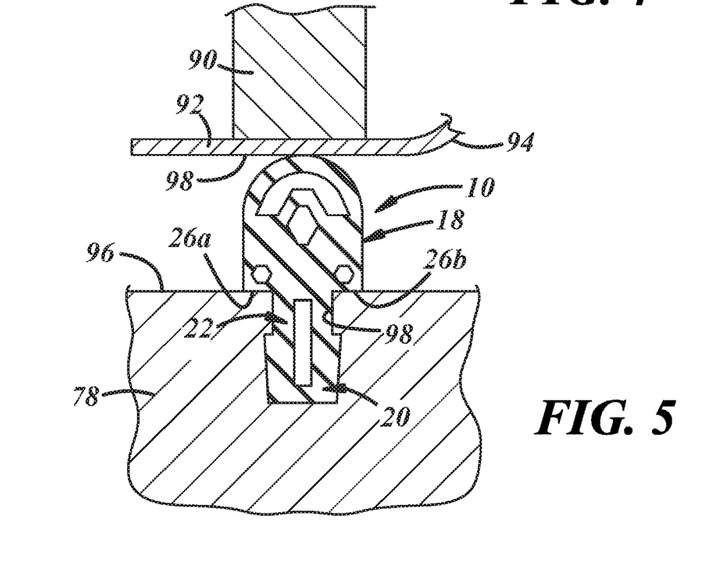
FIG. 5 is a cross-sectional view of the sealing member of FIG. 1, taken along the same section lines as before, after having been received in a seal retention groove defined in a peripheral sealing surface of a powder box of the schematic slush molding apparatus shown in FIG. 4 according to one embodiment of the present disclosure.

Referring now to FIGS. 4-5, a representative slush molding apparatus 70 is illustrated that incorporates the sealing member 10 described above. The slush molding apparatus 70 includes a powder box 72 and a mold 74 and is rotatable about an axis of rotation A. The powder box 72 includes a base housing 76 and a cover 78. The base housing 76 has a bottom 80 and a sidewall 82 that extends away from the bottom 80. The cover 78 is attached to the sidewall 82 of the base housing 76 to thereby provide a powder reservoir 84 that holds a powdered resin 86. The cover 78 defines at least one opening 88 to the powder reservoir 84 that allows passage of the powdered resin 86 into and out of the powder reservoir 84. The mold 74 is sealingly coupleable to the powder box 72 by clamping pressure and other non-permanent connections. The mold 74 includes a frame 90 and a shell 92. The frame 90 supports the shell 92, as shown generally in FIG. 4. And, when the mold 74 and the powder box 72 are coupled together, the shell 92 is disposed over and covers the opening 88 to the powder reservoir 84. The shell 92 includes a forming surface 94 that faces interiorly towards the powder reservoir 84 and is thus exposed to contact with the powdered resin 86. The shell 92, which is preferably constructed from nickel, a nickel-based alloy, or a nickel-plated base metal, is typically 1-5 mm thick and is three-dimensionally shaped to provide the forming surface 94 with a certain predetermined contour.

The cover 78 of the powder box 72 includes a peripheral sealing surface 96 that surrounds the opening 88 to the powder reservoir 84 as shown best in FIG. 5. The peripheral sealing surface 96 defines an intruding seal retention groove 98 that receives the sealing member 10 described above. Specifically, the anchor portion 20 and the neck portion 22 of the sealing member 10 are received in the seal retention groove 98, while the first and second lateral shoulder surfaces 26a, 26b of the head portion 18 of the sealing member 10 engage the sealing surface 96 outwardly from and adjacent to the groove 98. When the powder box 72 and the mold 74 are brought together and coupled to provide the powder slush molding apparatus 70, a sealing surface 98 of the shell 92 is urged against the head portion 18 of the sealing member 10, which in turn compresses the head portion 18 to invoke a seal between the shell 92 and the cover 78 of the powder box 72 while also delineating the forming surface 94 that is located inboard of the sealing member 10 and covers the opening 88 of the powder box 72. And, as described above, the compressibility of the head portion 18 of the sealing member 10 reduces the amount of stress that is placed on the shell 92 to achieve adequate sealing. As such, the shell 92 is less likely to be damaged or cracked from stress concentrations around the sealing member 10 and, as an added benefit, the positioning and alignment tolerances between the powder box 72 and the mold 74 do not have to be overly strict compared to more rigid and less compressibly tolerant sealing members.

The shell 92 of the mold 74 is heated either before or after the powder box 72 and the mold 74 are sealingly coupled together. The shell 92 may be heated to a temperature that ranges from 210° C. to 250° C. Once the shell 92 is heated and the powder box 72 and the mold 74 are sealingly coupled together, the powder slush molding apparatus 70 is rotated about its axis of rotation A, as illustrated in FIG. 4. This causes the powdered resin 86 to flow under the force of gravity through the opening 88 of the powder box 72 and into contact with the heated forming surface 94 of the shell 92, and to then fall back through the opening 88 into the powder reservoir 84, with each full rotation of the powder slush molding apparatus 70. The powdered resin 86 that contacts the forming surface 94 of the heated shell 92—the powdered resin 86 preferably being composed of polyvinyl chloride (PVC) or thermoplastic polyurethane (TPU)—melts and becomes adhered to the forming surface 94 while the powdered resin 86 that does not melt and adhere to the forming surface 94 simply returns to the powder reservoir 84. A deposited polymer layer 100 is thus formed on the forming surface 94. Once the deposited polymer layer 100 has reached a desired thickness, which may range from 0.5 mm to 1.5 mm, the rotation of the powder slush molding apparatus 70 is ceased, the shell 92 is cooled, and the resultant hardened polymer skin 102 is removed.

Figure 6:
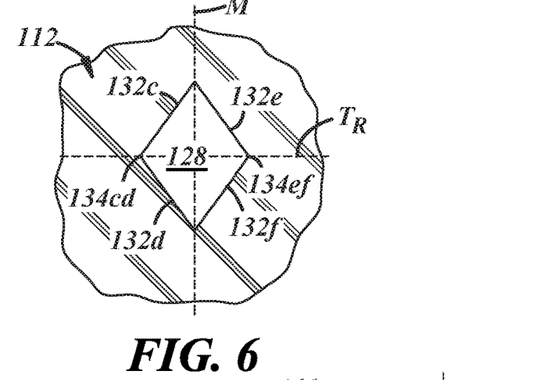
FIG. 6 is a magnified view of the at least one interior channel that is defined within the head portion of the elastomeric main body of a sealing member according to another embodiment of the present disclosure.
Figure 7:
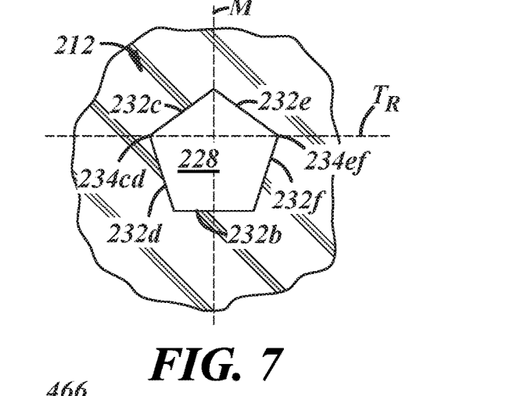
FIG. 7 is a magnified view of the at least one interior channel that is defined within the head portion of the elastomeric main body of a sealing member according to another embodiment of the present disclosure.

The sealing member 10 described above can be modified in numerous ways without losing its functionality or adversely affecting its performance. For instance, the at least one interior channel may assume a different polygonal sectional shape. Some examples of other polygonal sectional shapes that the interior channel 28 may assume are depicted in FIGS. 6-7. In FIG. 6, an interior channel 128 is shown having a rhomboidal sectional shape that is defined by two opposed upper side interior planar wall segments 132c, 132e and two opposed lower side interior planar wall segments 132d 132f The upper and lower side interior planar wall segments 132c, 132d, 132e, 132f intersect to establish two side vertices 134cd, 134ef. And, similar to the hexagonal sectional shape of the interior channel 28 shown in FIGS. 1-3, the rhomboidal sectional shape is divided symmetrically about the midline M of the elastomeric main body 112 and the side vertices 134cd, 134ef are intersected by the transverse line $T_R$.

In FIG. 7, an interior channel 228 is shown having a pentagonal sectional shape that is defined by two opposed upper side interior planar wall segments 232c, 232e, two opposed lower side interior planar wall segments 232d 232f, and a bottom interior planar wall segment 232b. The upper and lower side interior planar wall segments 232c, 232d, 232e, 232f intersect to establish two side vertices 234cd, 234ef. The pentagonal sectional shape is also divided symmetrically about the midline M of the elastomeric main body 212 and the side vertices 234cd, 234ef are intersected by the transverse line $T_R$ as before with the other depicted implementations of the interior channel 28, 128. Other polygonal sectional shapes for the at least one interior channel may be employed as well including, but not limited to, heptagonal and octagonal sectional shapes.

Figure 8:
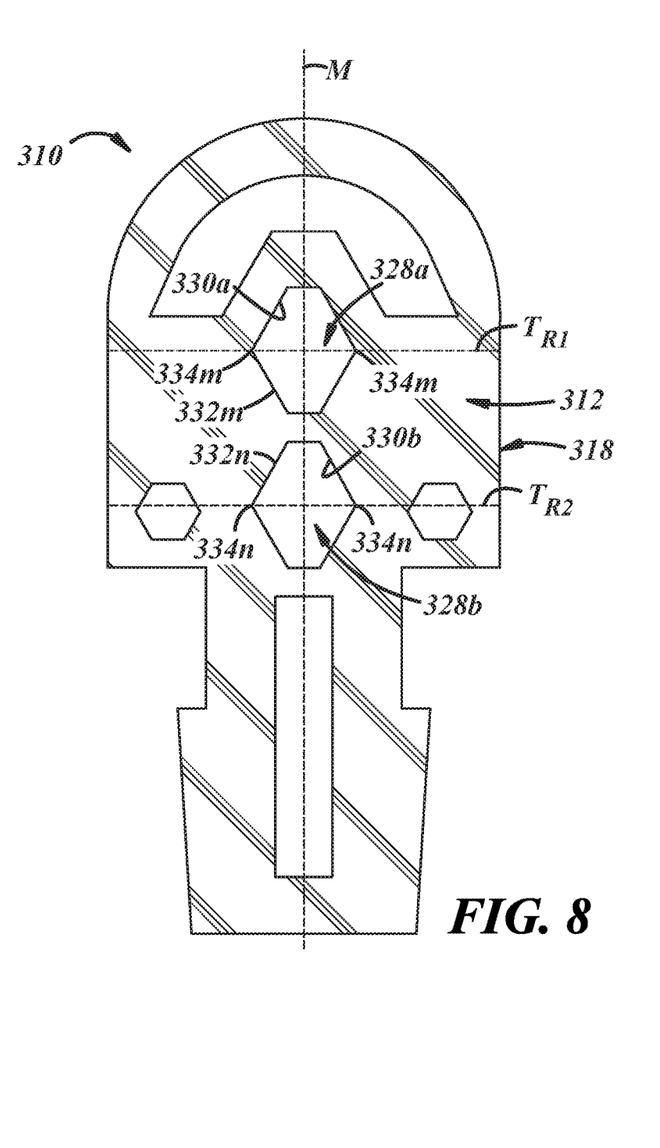
FIG. 8 is a cross-sectional view of a sealing member, taken along the same section lines as FIG. 2, according to yet another embodiment of the present disclosure.
Figure 9:
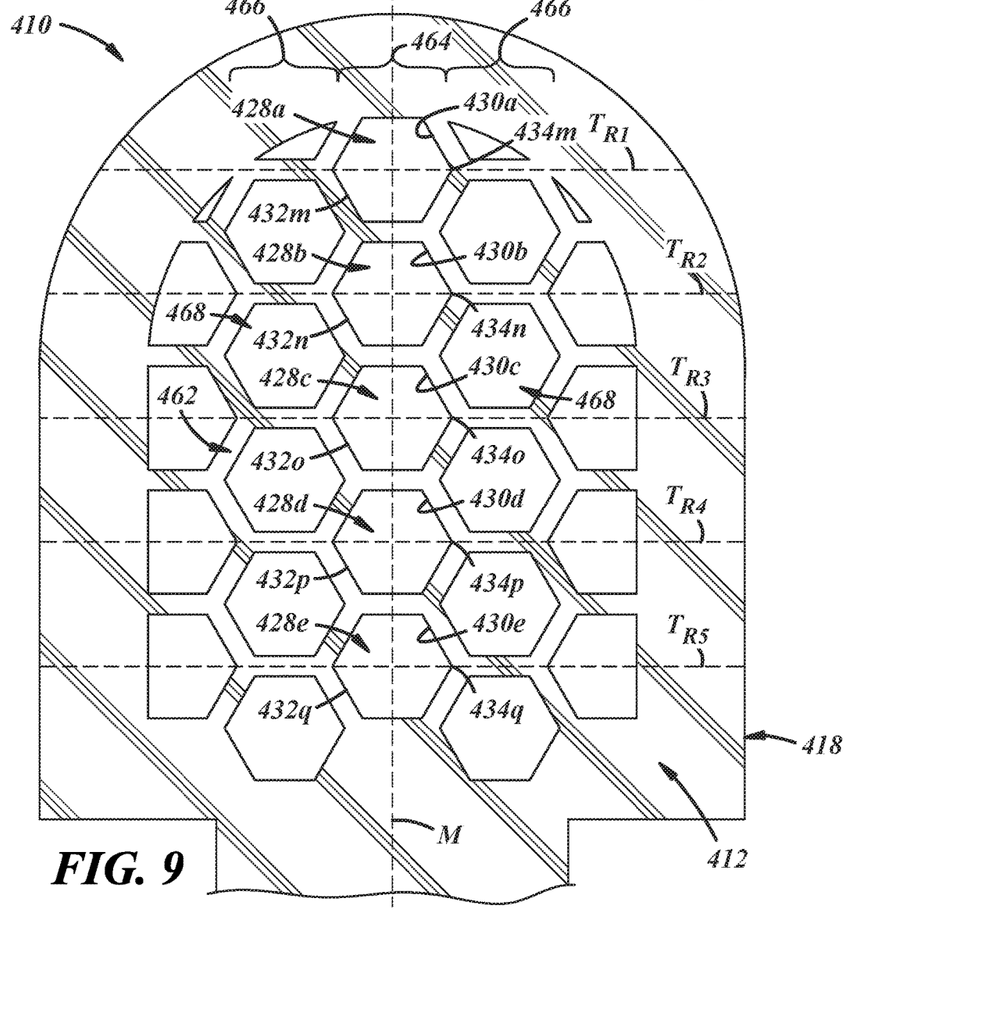
FIG. 9 is a cross-sectional view of the head portion of the elastomeric main body of a sealing member, taken along the same section lines as FIG. 2, according to yet embodiment of the present disclosure.

The head portion 18 of the elastomeric main body 12 may also define more than one interior channel, i.e., a plurality of interior channels, as depicted in the sealing members 310, 410 shown specifically in FIGS. 8-9. Each of the plurality of interior channels may assume any of the polygonal sectional shapes in the manner described above. In FIG. 8, for instance, the elastomeric main body 312 of the head portion 318 defines a first interior channel 328a and a second interior channel 328b that are spaced apart along the midline M of the elastomeric main body 312. Each of the first interior channel 328a and the second interior channel 328b is centered on the midline M of the elastomeric main body 312 and has a polygonal shape when viewed in the sectional plane P as before. Additionally, the first interior channel 328a and the second interior channel 328b are defined by a first interior wall surface 330a and a fifth interior wall surface 330b (assuming the other optional internal passageways are present), respectively, that includes a plurality of interconnected interior planar wall segments 332m, 332n. A first transverse line $T_{R1}$ intersects two side vertices 334m of the planar wall segments 332m of the first interior wall surface 330a and a second transverse line $T_{R2}$ intersects two side vertices 334n of the planar wall segments 332n of the fifth interior wall surface 330b as described above. And because the first and second interior channels 328a, 328b are centered on, and spaced apart along, the midline M, the first and second transverse lines $T_{R1}$, $T_{R2}$ are parallel to each other and are separated along the height dimension H of the sealing member 310. The first and second interior channels 328a, 328b may have the same polygonal sectional shape or they may have different polygonal sectional shapes.

In FIG. 9, the elastomeric main body 412 of the head portion 418 includes an interconnected honeycomb webbing 462 that defines a central column 464 of interior channels 428 arranged in series on the midline M of the elastomeric main body 412. Each of the interior channels 428a-e of the central column 464 is centered on the midline M of the elastomeric main body 412 and has a polygonal shape when viewed in the sectional plane P as before. Moreover, each of the interior channels 428a-e is defined by a respective interior wall surface 430a-e that includes a plurality of interconnected interior planar wall segments 432m-q. And, similar to the previous embodiments, two side vertices 434m-q of the planar wall segments 432m-q of the interior wall surfaces 430a-e of each interior channel 428a-e are intersected by respective transverse lines $T_{R1}$, $T_{R2}$, $T_{R3}$, $T_{R4}$, $T_{R5}$. These transverse lines $T_{R1}$, $T_{R2}$, $T_{R3}$, $T_{R4}$, $T_{R5}$ are parallel to each other and separated along the height dimension H of the sealing member 410. The interconnected honeycomb webbing 462 may further define at least one adjacent column 466 of interior channels 468 on each side of the central column of interior channels 428. The interior channels 468 in each of these adjacent columns 466 may be offset in the height dimension H of the sealing member 410 from the interior channels 428 in the central column 464; that is, the central axes of the interior channels 428 in the central column 464 are not parallelly aligned with the central axes of the interior channels 468 in the adjacent columns 466 along the thickness dimension T of the sealing member 410, as shown. The interior channels 428, 468 defined by the interconnected honeycomb webbing 462 may assume any polygonal sectional shape discussed above and, preferably, all of the interior channels 428, 468 share the same shape.

Figure 10:
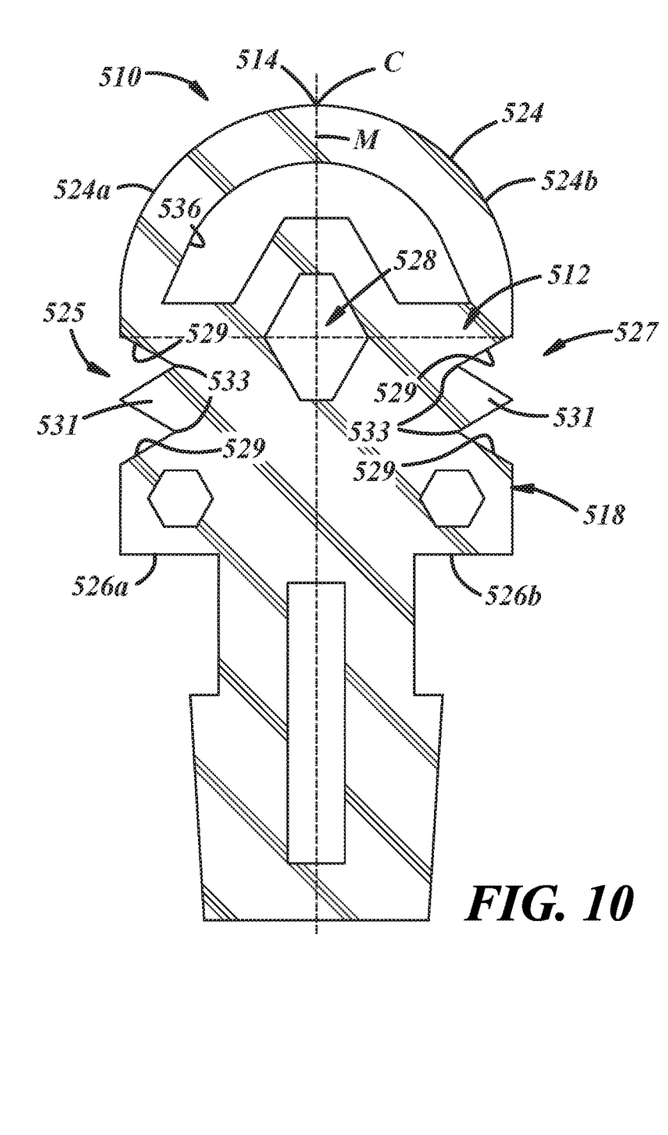
FIG. 10 is a cross-sectional view of a sealing member, taken along the same section lines as FIG. 2, according to still another embodiment of the present disclosure.

In yet another variance of the sealing member, as shown in FIG. 10, a notched portion 525 of the first exterior side surface 524a and a notched portion 527 of the second exterior side surface 524b may define a series of intruding notches 529 that extend along the length dimension L of the sealing member 510 within the head portion 518. The intruding notches 529 in each notched portion 525, 527 of the exterior side surfaces 524a, 524b are spaced apart along the height dimension H of the sealing member 510 and provide the elastomeric main body 512 with one or more intervening teeth 531. Each of the notches 529 may have a V-shaped sectional shape when viewed in the sectional plane P while narrowing inwardly into the elastomeric main body 512 to a root 533. Moreover, the notched portion 525, 527 on each of the exterior side surfaces 524a, 524b is preferably defined more proximate to its respective first or second lateral shoulder surface 526a, 526b of the head portion 518 than to the centerline C of the head portion 518 and is also preferably below the transverse line $T_R$ (if only one interior channel is present) or the transverse line $T_R$ nearest the first end 514 of the sealing member 510 (if a plurality of interior channels is present). In this way, and especially if the notches 529 defined in each notch portion 525, 527 exhibit V-shaped sectional shapes, the notched portions 525, 527 of the exterior surface 524 can demonstrate an accordion-like function when the compressive force F is applied to the head portion 518 of the sealing member 510, which, in turn, can enhance the compressibility of the head portion 518 and help the head portion 518 collapse more easily. The notched portions 525, 527 may be applied to any of the previously described embodiments of the sealing member 10, 110, 210, 310, 410.

It is to be understood that the foregoing description is of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A sealing member for a powder slush molding apparatus, the sealing member comprising:
   an elastomeric main body that extends between a first end and a second end along a height dimension of the sealing member, the elastomeric main body comprising:
   a head portion that includes an exterior surface and that provides the first end of the main body,
   an anchor portion that provides the second end of the main body, and
   a neck portion that extends between and joins the head portion and the anchor portion of the main body, each of the head portion, the anchor portion, and the neck portion being bisected by a midline that runs parallel to the height dimension of the sealing member,
   wherein the elastomeric main body defines an interior channel within the head portion that is centered about the midline, the interior channel extending along a length dimension of the sealing member and having a polygonal sectional shape in a plane oriented orthogonal to the length dimension of the sealing member,
   wherein the interior channel is defined by a first interior wall surface of the elastomeric main body that includes one vertex on one side of the midline and another vertex on the other side of the midline, the two vertices being intersected by a transverse line that extends through the head portion of the elastomeric main body within the sectional plane and is orthogonal to the height dimension of the sealing member,
   wherein the elastomeric main body further defines an interior arcuate slot within the head portion of the main body, the interior arcuate slot being centered about the midline of the elastomeric main body and located between the interior channel and the exterior surface of the head portion, the interior arcuate slot exhibiting concavity toward the interior channel,
   wherein the interior arcuate slot is defined by a second interior wall surface that includes a concave portion centered about the midline of the elastomeric main body and exhibiting concavity toward the interior channel, and
   wherein the interior arcuate slot and the interior channel are distinct and separated from each other by a wall of the head portion of the elastomeric main body.

2. The sealing member set forth in claim 1, wherein the exterior surface of the head portion at the first end of the elastomeric main body is a convex surface centered about the midline of the elastomeric main body, at least a portion of the convex surface being parallel with the concave portion of the second interior wall surface.

3. The sealing member set forth in claim 1, wherein the exterior surface of the head portion includes a notched portion in which a series of notches that narrow inwardly toward the midline into the head portion of the elastomeric main body are defined to provide one or more intervening teeth extending in the direction of the transverse line away from the midline, each of the notches in the notched portion extending along the length dimension of the sealing member and being spaced apart along the height dimension of the sealing member.

4. The sealing member set forth in claim 1, wherein the interior channel has a hexagonal sectional shape defined entirely by an elastomeric material.

5. The sealing member set forth in claim 1, wherein the interior channel has a third vertex located between the transverse line and the arcuate slot along the height dimension and a fourth vertex located between the transverse line and the neck portion along the height dimension.

6. The sealing member set forth in claim 1, wherein the interior channel is a first interior channel, the elastomeric main body defining a second interior channel spaced apart from the first interior channel along the midline, each interior channel being centered on the midline and having an identical size and shape in the sectional plane.

7. The sealing member set forth in claim 1, wherein the elastomeric main body includes an interconnected honeycomb webbing, the interior channel being one of a central column of interior channels defined by the honeycomb webbing and arranged in series on the midline of the elastomeric main body, wherein the honeycomb webbing additionally defines at least one adjacent column of interior channels on each side of the central column of interior channels, each interior channel having an identical size and shape in the sectional plane.

8. The sealing member set forth in claim 1, wherein the elastomeric main body is composed of silicone rubber.

9. A powder slush molding apparatus comprising:
a powder box that defines a powder reservoir that contains a powdered resin, the powder box defining at least one opening to the powder reservoir and further having a peripheral sealing surface around the opening, the peripheral sealing surface defining a seal retention groove;
a mold that is sealingly coupled to the powder box, the molding comprising a shell that covers the opening to the powder reservoir and has a forming surface configured for contact with the powdered resin upon rotation of the powder slush molding apparatus, the shell further having a sealing surface that opposes the peripheral sealing surface of the powder box; and
the sealing member set forth in claim 1 received in the seal retention groove of the powder box such that the head portion of the sealing member rises upwards from the peripheral sealing surface of the powder box outside of the seal retention groove and is compressed between the sealing surface of the shell and the peripheral sealing surface of the powder box.

10. A sealing member for a powder slush molding apparatus, the sealing member comprising:
an elastomeric main body that extends between a first end and a second end along a height dimension of the sealing member, the elastomeric main body comprising:
a head portion that includes an exterior surface and that provides the first end of the main body,
an anchor portion that provides the second end of the main body, and
a neck portion that extends between and joins the head portion and the anchor portion of the main body, each of the head portion, the anchor portion, and the neck portion being bisected by a midline that runs parallel to the height dimension of the sealing member,
wherein the elastomeric main body defines two distinct interior channels within the head portion that are centered about the midline, each interior channel extending along a length dimension of the sealing member and having a polygonal sectional shape in a plane oriented orthogonal to the length dimension of the sealing member,
wherein each interior channel is defined by an interior wall surface of the elastomeric main body that includes one vertex on one side of the midline and another vertex on the other side of the midline, the two vertices of each interior wall surface being intersected by respective transverse lines that extend through the head portion of the elastomeric main body within the sectional plane and are orthogonal to the height dimension of the sealing member,
wherein the two vertices of each interior wall surface are spaced apart the same amount along the respective transverse line,
wherein the elastomeric main body is made from an elastomeric material, the interior wall surface of each interior channel being defined by said elastomeric material such that the entire interior wall surface of each interior channel is made from said elastomeric material, and
wherein each interior wall surface comprises a plurality of interconnected interior planar wall segments made from the elastomeric material that together define an entire perimeter of the respective interior channel.

11. The sealing member set forth in claim 10, wherein the elastomeric main body further defines an interior arcuate slot within the head portion of the main body, the interior arcuate slot: being distinct from the two interior channels, being centered about the midline of the elastomeric main body, being located between the interior channels and the exterior surface of the head portion, and exhibiting concavity toward the interior channels.

12. The sealing member set forth in claim 1, wherein the arcuate slot partially overlaps with the interior channel in the height dimension when the head portion is in an uncompressed state.

13. The sealing member set forth in claim 10, wherein the two interior channels have an identical size and enclosed shape in the sectional plane.

14. The sealing member set forth in claim 10, wherein the two interior channels are defined within a central column of interior channels defined by an interconnected honeycomb webbing of the elastomeric main body, the central column of interior channels being arranged in series on the midline of the elastomeric main body, and the honeycomb webbing further defining at least one adjacent column of interior channels on each side of the central column of interior channels, wherein each interior channel has an identical size and shape in the sectional plane.

15. The sealing member set forth in claim 10, wherein the exterior surface of the head portion extends outwardly and downwardly from a centerline to a lateral shoulder surface that extends inward from the exterior surface toward the midline of the elastomeric main body, the exterior surface having a notched portion in which a series of notches that narrow inwardly into the elastomeric main body are defined to provide one or more intervening teeth, each notch in the notched portion extending along the length dimension of the sealing member and being spaced apart along the height dimension of the sealing member.

16. The sealing member set forth in claim 10, wherein the interior channel has a hexagonal sectional shape or a polygonal shape with a third vertex along the midline.

17. The sealing member set forth in claim 1, wherein the elastomeric main body is made from an elastomeric material, the first interior wall surface and the second interior wall surface each being defined by said elastomeric material such that the entire first interior surface and the entire second interior surface is made from said elastomeric material.

18. The sealing member set forth in claim 1, wherein the first interior wall surface comprises a plurality of interconnected interior planar wall segments made from an elastomeric material that together define an entire perimeter of the interior channel.

19. The sealing member set forth in claim 1, wherein the interior channel is empty.

20. The sealing member set forth in claim 1, wherein the wall by which the interior arcuate slot and the interior channel are separated from each other is an interior arched wall that provides a portion of the first interior wall surface exhibiting concavity toward the interior channel and a portion of the second interior wall surface opposing the concave portion of the second interior wall surface across the arcuate slot in the height direction.

* * * * *